Patented Feb. 18, 1930

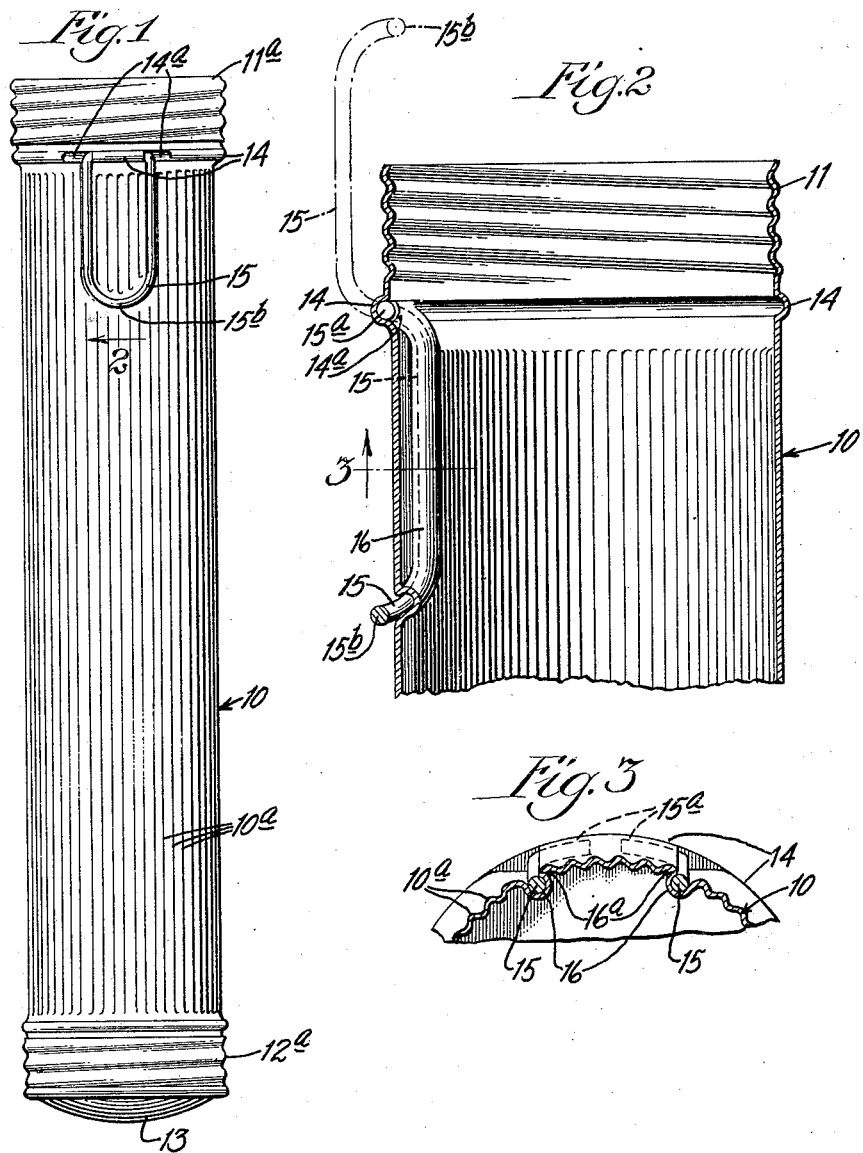

1,747,811

UNITED STATES PATENT OFFICE

EDMUND R. BARANY, OF MADISON, WISCONSIN, ASSIGNOR TO FRENCH BATTERY COMPANY, OF MADISON, WISCONSIN, A CORPORATION OF WISCONSIN

FLASH-LIGHT CASING

Application filed November 19, 1928. Serial No. 320,257.

This invention relates to improvements in flashlight casings and, more especially, to such a casing provided with a hinged bail or handle by which the casing may be supported from any suitable hook, nail or other projection.

One of the features of the invention is to provide such a bail that is hingedly attached to the casing so that it may readily be moved from operative position to inoperative position. When in operative position, the end of the bail projects some distance beyond the end of the casing, thus facilitating hooking the same over a nail or hook.

When the bail is in inoperative position, it is releasably secured in a keeper-recess formed in the side of the casing where it is out of the way. It may be snapped into an inoperative position by a gripping action of the hand in picking up the flashlight.

My improved bail, and mounting therefor, is also so designed that the same does not detract from the appearance of the casing as a whole.

Other features and advantages of my invention will appear more fully as I proceed with my specification.

In that form of device embodying the features of my invention, shown in the accompanying drawings, Figure 1 is a view in side elevation; Fig. 2 is a view taken as indicated by the line 2 of Fig. 1; and Fig. 3 is a view taken as indicated by the line 3 of Fig. 2.

As shown in the drawings, the casing proper 10 is cylindrical in form and preferably formed out of sheet metal. The base or rear end is preferably provided with screw threads 11 for mounting the usual cap or end closure 11ª and the forward end is similarly provided with the usual threaded ring 12ª adapted to retain the lens 13.

Between the threaded ends, the casing is here shown as provided with longitudinal corrugations 10ª which enhance the appearance of the same. At the base of the threads 11 there is provided an annular raised corrugation 14 having two spaced openings 14ª, 14ª thereinto.

Numeral 15 indicates a U-shaped wire loop, hanger or bail preferably made out of wire, with its ends 15ª projecting toward each other through the openings 14ª, 14ª and lying under the corrugation 14. The bail 15 is adapted for swinging movement on the ends 15ª as trunnions so that the same is thus hingedly attached to the casing. The bail is adapted to be swung from operative position, as shown by the broken lines in Fig. 2, with its end projecting beyond the end of the casing 10 to inoperative position, as shown in Fig. 3.

Numeral 16 indicates a loop-shaped keeper-recess in the side walls of the casing adapted to house the bail 15 when the same is in inoperative position, as shown in Fig. 3. The wire forming the bail 15 is preferably made substantially the same diameter as one of the longitudinal corrugations 10ª and the side reaches of the groove 16 are preferably made co-incident with two of the corrugations 10ª so that when the bail is folded into the groove in inoperative position, it will detract very little from the regular corrugated appearance of the shell. The inner walls of the side reaches of the keeper-recess 16, as indicated by 16ª, are preferably extended outwardly a slight distance so as to form overhanging shoulders under which the sides of the bail 15 may be snapped when it is folded into the keeper-recess. The bail is thus releasably held in the recess when in inoperative position. The bail 15 is preferably made out of spring wire and the ends 15ª are adapted to be separated slightly to permit such snapping engagement.

The web-end portion of the bail 15, as indicated by 15ᵇ, is preferably bent outwardly a short distance so that when the bail is in inoperative position in the keeper-recess 16, the lower end 15ᵇ will lie a sufficient distance from the wall of the casing 10 to permit insertion thereunder of the finger nail in order to release the bail and swing it outwardly to operative position. The pivot portion of the bail is also bent or offset from the plane of the arms of the bail so that the bail will fit into the recess properly and will not strike the cap of the flashlight when swung into a vertical operative position.

The foregoing detailed description has been given for clearness of understanding only, and no unnecessary limitations should be understood therefrom, but the appended claims should be construed as broadly as permissible in view of the prior art.

What I regard as new, and desire to secure by Letters Patent, is:

1. A flashlight casing comprising a cylindrical shell provided a short distance from one end with pivot-recesses and further from said end with a keeper-recess; and a bail normally housed in said keeper-recess having pivots at its outer end engaging said pivot-recesses, said bail being capable of swinging to position to project beyond the adjacent end of said shell.

2. A flashlight casing as specified in claim 1, in which the bail has an outwardly offset web-end portion normally projecting from said keeper-recess.

3. In a flashlight casing; a cylindrical shell provided at its base-end with a thread and adjacent the inner end of said thread with a hollow bead having pivot-recesses therethrough, said shell having also a keeper-recess extending from said bead; and a U-shape bail normally housed in said keeper-recess and having its arms provided with pivot-lugs entered through said recesses and engaging the inner surface of said bead, said bail being adapted to swing about its pivots and project past the adjacent threaded end of said shell.

4. A device as specified in claim 3, in which the web of the bail and the pivots thereof are offset in a common direction from the plane of the arms of the bail.

In witness whereof, I have hereunto set my hand this 8th day of November, 1928.

EDMUND R. BARANY.